Figure 1:
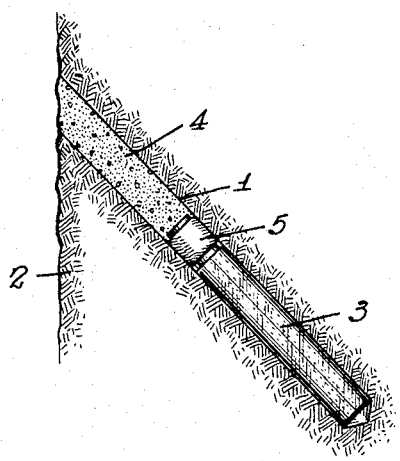

July 25, 1933.  J. W. MARTIN, JR  1,920,094
METHOD AND APPARATUS FOR GENERATING AND USING HIGH PRESSURE
Filed May 19, 1928

INVENTOR
James W. Martin Jr.
BY
George C. Allan
ATTORNEY

Patented July 25, 1933

1,920,094

UNITED STATES PATENT OFFICE

JAMES W. MARTIN, JR., OF YONKERS, NEW YORK, ASSIGNOR, BY MESNE ASSIGNMENTS, TO DRYICE EQUIPMENT CORPORATION, OF NEW YORK, N. Y., A CORPORATION OF DELAWARE

METHOD AND APPARATUS FOR GENERATING AND USING HIGH PRESSURE

Application filed May 19, 1928. Serial No. 279,000.

My present invention utilizes the expansion that results when solid carbon dioxide is melted under liquefying pressure and the further phenomenal temperature-volume expansive quality of carbon dioxide in the liquid state. My method includes producing the liquid at minimum temperature so that it will have maximum initial density; and under conditions such that the expansive effort due to rising temperature will be exerted primarily as hydraulic pressure of the liquid itself. This liquid pressure may be either preliminary to or a substitute for the gaseous pressures that have been utilized heretofore where ordinary liquid carbon dioxide has been employed as a source of power.

My present invention is related to that of my application Ser. No. 101,606 filed April 12, 1926, patented June 3, 1930 as Patent No. 1,760,953, only in the particular that the liquid carbon dioxide is produced by melting of compressed cakes of solid carbon dioxide. In said application, the liquid is produced under conditions such that the product is merely the usual liquid stored in the usual tanks under the usual conditions and employed for the usual purposes for which any other liquid carbon dioxide is used. It will be understood that such usual conditions of storage of the usual liquid in the usual tanks is rigidly controlled by rules requiring the number of pounds of liquid stored in any tank must be such that a safe margin of gas space will remain in the tank above the liquid, thereby making certain that the internal pressure can never exceed a wide margin of safety afforded by the strength of the tank. Thus the carbon dioxide in such tanks is partly liquid and partly gas and a series of correlative temperature-pressure ratios is automatically maintained between the gas and the liquid by the natural boiling or condensing of the liquid as the temperature rises or falls.

My present invention differs radically from the above. I utilize the phenomenal fact that the solid carbon dioxide, at freezing point is of much greater density, that is, occupies smaller space than does the liquid at the same temperature. Moreover, the cakes can be compressed in commercial practice to a specific gravity of more than 1.5. Accordingly, I use solid cakes of such density and charge enough of them into the container or other cavity in which they are to be used, so that upon absorption of heat melting the liquid, the cavity is filled with liquid at or near the freezing point of solid carbon dioxide, which is approximately 110° below zero F. It is a remarkable fact that when thus formed, the resulting liquid is of volume great enough not only to fill up the small interspaces between the blocks and the cavity, but also to apply great liquid pressure. Moreover, starting with the solid at the above density (1.5 times that of water at 39° F.) the change of volume by warming from solid to liquid and then warming the liquid up to critical temperature and pressure (88.4° F. and 1071 pounds) will result in a volume of liquid something like three times that of the original solid, assuming that the pressure imposed is not greater than 1071 pounds per square inch. Hence if the freshly melted liquid fills a fixed volume cavity, as contemplated by one embodiment of my invention, it will maintain gas free liquid condition while being warmed up to the critical temperature of 88° F., thus creating enormous hydraulic pressure. Similarly, if permitted to expand under a very heavy load, as contemplated by another embodiment of my invention, it will remain a liquid unless or until increase of temperature causes the load to be less than the boiling point pressure corresponding to said increased temperature of the liquid.

This may be better understood by considering illustrative cases as follows:

(1) The liquid at 60° below zero F. will not boil if it is under a pressure load greater than, say, 100 pounds per square inch.

(2) At 87° above zero F. it will not boil if the pressure is greater than 1052 pounds per square inch.

(3) The density of the liquid even when boiling at temperature −60° F. (pressure, say 100 pounds) is approximately 1.2 times that of water, whereas when boiling at 87° F. (pressure, say 1052 pounds) the density is approximately .57 that of water.

As concerns my present invention, this means that if the liquid at −60° F. is applied to a lifting jack piston under a load of 1052 pounds per square inch, warming the liquid to 87° F. will double its volume, thereby lifting the load a corresponding distance before it will begin to gasify. If reckoned from the original solid at density 1.5, melted and warmed to liquid at critical temperature 88.4° F. density .464, the total expansion is approximately 3 to 1 instead of 2 to 1.

The above are only a few of the more obvious and easily understood facts tending to illustrate some of the principles underlying the part of my invention that concerns utilizing the expansion and hydraulic pressure of the liquid which become available when the liquid is formed from the solid within the cavity in which the power is to be generated.

My invention is, of course, not limited to the hydraulic expansion, because in practical operation, temperatures may rise above the boiling point for the particular pressure load being operated upon, or the pressure load may fall below the boiling pressure for the then temperature. In such case, the purely hydraulic expansion effect will be followed by the combined effects of gas and liquid expansion. More broadly and practically considered, my method of making the liquid from the solid carbon dioxide in a translating device such as a lifting jack or other confined space has advantages regardless of whether the space is small enough or the load heavy enough to prevent gasifying. Consequently, my invention includes cases where the primary condition of expansion of the liquid without gasifying may be through only a small range of temperatures or may be absent.

One practical application of my method involves using it as a substitute for an explosive, as for instance, to form the solid $CO_2$ in dense cakes or sticks adapted to fit a drill hole, tamp the hole and then apply heat, either natural or artificial, to first melt the solid and then expand the liquid. In such case, the liquid will first act by hydraulic pressure to start rupture of the coal or other mineral and thereafter the sudden gasifying of the liquid will maintain a follow up pressure to complete the rupture. Such operation is particularly advantageous in coal mining, because there is no combustion; the product of the operation is fire extinguishing gas; and the expansive effort corresponding to the explosion has no peak of high pressure such as will disintegrate or pulverize the coal.

Another use is charging the frozen carbon dioxide into the pressure cavity of a lifting jack of the hydraulic type. In such case, a maximum load may be lifted by completing filling the cavity with frozen carbon dioxide. The denser the cake and the more perfectly it fits and fills the cavity, the greater the expansion and range of lift of the load before the gasifying stage is reached. A vent may be arranged in position to be uncovered by the piston of the jack at the end of its working stroke, thereby venting the pressure and avoiding danger of explosion which might otherwise result from further increase of temperature.

Figure 2:
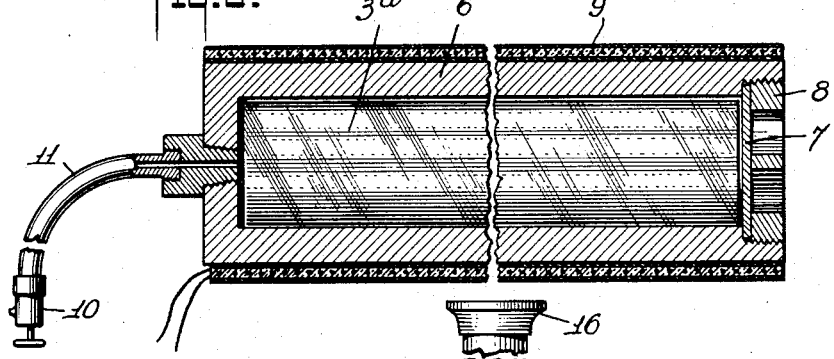
Figure 3:
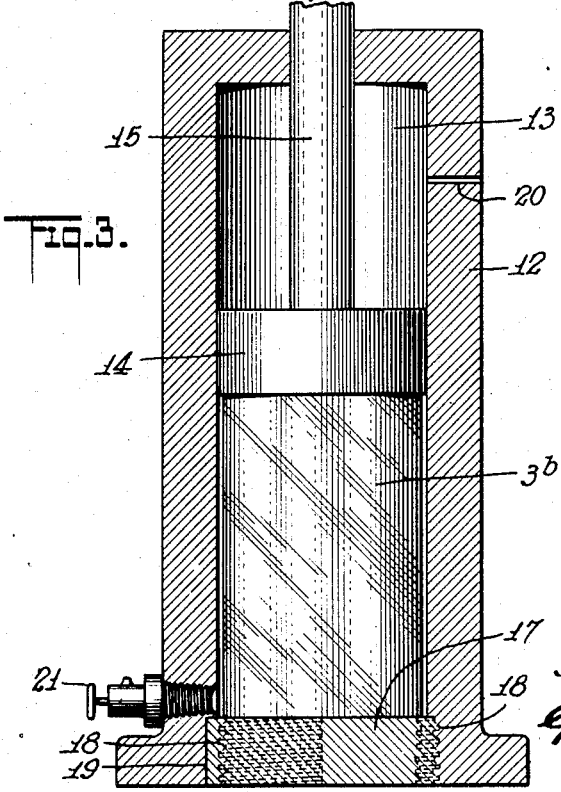

The above and other features of my invention may be more fully understood from the following description in connection with the accompanying drawing, in which Fig. 1 is a diagrammatic view illustrating a drill hole in rock, coal or the like, in longitudinal section, showing one way in which my invention may be embodied;

Fig. 2 is a longitudinal section through a fixed volume cartridge or the like, with a compressed block or stick of frozen carbon dioxide fitting the interior thereof; and Fig. 3 is a vertical axial section, showing application of my method to a lifting jack of the hydraulic type.

In Fig. 1 a hole 1 is drilled in a body 2, which may be rock, coal or the like. In the case shown, the body of rock or coal is assumed to be seamless. Consequently, it is sufficient to insert in the bottom of the drill hole, a stick 3 of frozen carbon dioxide, preferably of great density and preferably fitting the hole accurately. Obviously, the size and depth of the hole 1 and the length of the stick 3 will be predetermined with reference to the nature of the material and the internal pressure which it is desired to exert. Such charge of frozen carbon dioxide is confined in any desired way, as by tamping in sand, gravel or the like as indicated at 4, with or without the interposition of an expanding plug diagrammatically indicated at 5.

The frozen carbon dioxide 3, at a temperature of, say, −110° F. rapidly absorbs heat through the walls of the drill hole with which it is in contact. The cavity being primarily at atmospheric pressure and having a certain amount of void space therein, the frozen carbon dioxide will first sublimate sufficiently to raise the gas pressure sufficient to maintain a liquid state. Thereafter melting will take the place of sublimation and after the relatively low pressure of 100 pounds or so per square inch is reached, the cavity will be entirely filled with gas free liquid. Thereafter, the frozen carbon dioxide will continue to melt without substantial rise of temperature or increase of volume until it is nearly or completely liquefied. Thereafter, further warming of the liquid carbon dioxide will operate to create the above described hydraulic pressures, which being exerted in the fixed volume cavity, rise to a very high value, causing rupture of the walls of the cavity, thus producing the desired splitting or breaking of the material 2. The sensible heat absorbed during this period will put the liquid in condition for rapid expansion as soon as the walls of the cavity are broken. Thereupon the gasifying carbon dioxide will apply a follow up pressure in all the crevices operating to separate them and to split the material 2 into fragments. The cracking of the walls of the cavity will be facilitated more or less, in accordance with the nature of the material by the intense localized refrigeration produced by the melting of the frozen carbon dioxide.

In certain cases, particularly where the material 2 has flaws or cracks, it may be desirable to enclose the frozen carbon dioxide in a cartridge-like casing somewhat as indicated in Fig. 2.

In Fig. 2 a stick of dense frozen carbon dioxide, 3a, of any desired length, is enclosed in a strong casing 6, preferably of steel, designed to withstand a predetermined internal pressure, so that the frozen carbon dioxide may be melted, and if desired warmed to ordinary atmospheric temperatures without causing rupture of the casing 6. As shown, the casing 6 has a closure 7 secured by a screw clamping member 8. In the form shown, the closure 7 is designed to be ruptured by a predetermined internal pressure, at which it is desired to release the liquid. This may be determined by the thickness and kind of material employed for the diaphragm 7 and also by the area thereof that is left unsupported by the clamping member 8.

If desired, the cartridge 6 may be a relatively thin metal casing adapted itself to rupture and be destroyed when the desired internal pressure is reached.

If desired to insure prompt operation of the cartridge, heating means may be employed in combination therewith. This may be in the form of an electrical heating resistance 9 shown as a jacket surrounding the cartridge, although it might be a separate unit located at the end thereof.

The cartridge may be supplied with a vent valve 10, connected either directly or through a tube 11. By this means, the charge of the cartridge may be vented either to prevent rise of internal pressure until the cartridge is in position, ready for use or to quietly relieve the pressure after it has accumulated. For instance, where the cartridge is used in a drill hole such as shown in Fig. 1, the pipe 11 may extend outside the hole and the valve 10 left open until the cartridge is tamped in place and ready for "firing". Afterwards, if the charge has proved insufficient to shatter the material 2, the valve 10 can be opened to vent the charge and render the cartridge harmless.

In Fig. 3, a lifting jack is more or less diagrammatically indicated, as including a casing 12 adapted to withstand high pressure, formed with a cylindrical cavity 13 in which is fitted a piston 14 having a stem 15 extending above the casing and formed with a support 16 for the load to be lifted. The lower end of the cylindrical cavity is closed by a breech block 17, preferably of larger diameter than said cylinder so that when it is removed, the opening will permit the insertion of a block of frozen carbon dioxide, 3b, of a diameter which will substantially fit said cylinder. The breech block may be removably secured in position by screw-threads, preferably of the buttress type as indicated at 18, and the threads may be interrupted as indicated at 19, after the manner of ordinance breech blocks, so as to permit the block to be inserted by sliding to place and then turning through a small arc. The piston may be made removable through the top for insertion of the charge, in which case the bottom may be integral.

The melting and expansion may be accelerated by supplying additional heat, as, for instance, by applying a blow-pipe flame to the casing 12.

The casing 12 is preferably provided with a vent passage, 20, located so as to be uncovered by the piston near the upper end of its stroke, thereby automatically venting the pressure and preventing further lift thereof. Preferably, a manually operable vent is also provided near the base of the cylinder as indicated at 21, so that the pressure may be vented at will to control the piston. In this way, the rate of lift may be regulated or the piston may be held stationary under load in any desired position, or a load may be lowered at any desired rate.

Specific variations of my method, include the following:

Where the maximum range of increasing volume or increasing pressure is desired, the frozen carbon dioxide should be of maximum density and should fit the cavity in which it is initially confined, as closely as possible. It will be evident, however, that a loosely fitting cake of maximum density or its equivalent, a perfectly fitting cake of much less density, may be used, the essential factor being the weight of carbon dioxide that is charged into a given space. Where less than maximum, the result is what may be called lost motion, that is to say, when the weight of frozen carbon dioxide is less than the maximum that could be fitted into the space, there will be greater voids which the melted carbon dioxide will have to fill before the pressure becomes high enough to condense all of the gas and fill the space with liquid and, the greater these voids are the more temperature of the liquid will have to be raised to take up the slack.

Even so, my basic principle of beginning with frozen carbon dioxide as the source involves a special advantage that the operation always starts from the lowest possible temperature, namely, the melting point of the solid.

Thus, it will be seen that in its broadest aspect, my invention involves a method of generating and applying fluid carbon dioxide pressures wherein the first essential is employing solid carbon dioxide, confining it either in a fixed volume space or under a desired pressure load and then causing or permitting it to warm up for the purpose and with the result of producing a desired pressure effect with a minimum weight of carbon dioxide.

While I have herein disclosed certain specific cases where the amount (weight) of the frozen carbon dioxide is predetermined with reference to the confining space for the purpose of doing certain kinds of mechanical work, many other uses will suggest themselves to those skilled in the art.

I claim:

1. A jack, including cylinder and piston affording a closed space for a fluid pressure medium behind said piston, constructed and arranged so that said space may be substantially filled with frozen carbon dioxide in rigid cake form, and a manually controlled outlet from said space whereby the pressure may be vented to control operation of the piston under load.

2. A jack, including cylinder and piston affording a closed space for a fluid pressure medium behind said piston, constructed and arranged so that said space may be substantially filled with frozen carbon dioxide in rigid cake form, an outlet adapted to vent said space automatically when the piston has been forced outward a predetermined distance by pressure exerted within said cavity, and a manually controlled outlet from said space whereby the pressure may be vented to control operation of the piston under load.

JAMES W. MARTIN, Jr.